(12) United States Patent
Poon et al.

(10) Patent No.: US 10,338,807 B2
(45) Date of Patent: Jul. 2, 2019

(54) ADAPTIVE INK PREDICTION

(71) Applicant: Microsoft Technology Licensing, LLC, Redmond, WA (US)

(72) Inventors: Patrick Jee-An Poon, Bellevue, WA (US); Jianfeng Lin, Bellevue, WA (US); Xiao Tu, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 15/051,582

(22) Filed: Feb. 23, 2016

(65) Prior Publication Data
US 2017/0242579 A1    Aug. 24, 2017

(51) Int. Cl.
G06F 3/0488  (2013.01)
G06N 5/02   (2006.01)
G06F 3/041  (2006.01)

(52) U.S. Cl.
CPC ........ *G06F 3/04883* (2013.01); *G06F 3/0416* (2013.01); *G06N 5/022* (2013.01)

(58) Field of Classification Search
CPC ............... G06F 17/242; G06F 3/03545; G06F 3/04883; G06T 1/20; G06T 1/203
See application file for complete search history.

(56) References Cited

U.S. PATENT DOCUMENTS

| 5,837,947 | A  | 11/1998 | Teterwak |
| 6,771,266 | B2 | 8/2004  | Lui et al. |
| 7,010,165 | B2 | 3/2006  | Hullender et al. |
| 7,437,003 | B1 | 10/2008 | Gorbatov et al. |
| 7,450,125 | B2 | 11/2008 | Wang et al. |
| 7,463,779 | B2 | 12/2008 | Napper |
| 8,014,630 | B1 | 9/2011  | Polyakov et al. |
| 2004/0021691 | A1 | 2/2004 | Dostie et al. |

(Continued)

FOREIGN PATENT DOCUMENTS

| EP | 0848350 A1    | 6/1998 |
| WO | 1999039302 A1 | 8/1999 |
| WO | 2008147647 A1 | 12/2008 |

OTHER PUBLICATIONS

Henzen, et al., "Sketching with a Low-Latency Electronic Ink Drawing Tablet," In Proceedings of the 3rd International Conference on Computer Graphics and Interactive Techniques, Nov. 30, 2005, 10 pages.

(Continued)

*Primary Examiner* — Dong Hui Liang
(74) *Attorney, Agent, or Firm* — Fountainhead Law Group P.C.

(57) ABSTRACT

A facility for adapting the prediction of ink is described. In some examples, the facility receives information about a spatial movement by a user. On the basis of the received information, the facility predicts future spatial movement by the user, and generates an ink stroke that reflects both the spatial movement described by the received information and at least a portion of the predicted future spatial movement. The facility enforces against the generated ink stroke a limit that has the effect of controlling the area of a portion of the ink stroke corresponding to the at least a portion of the predicted future spatial movement, and causes the generated ink stroke, subject to the enforcement of the limit, to be displayed.

8 Claims, 11 Drawing Sheets

(56) References Cited

U.S. PATENT DOCUMENTS

| | | | |
|---|---|---|---|
| 2004/0140962 A1 | 7/2004 | Wang et al. | |
| 2005/0089237 A1 | 4/2005 | Park et al. | |
| 2006/0279548 A1* | 12/2006 | Geaghan | G06F 3/0416 345/173 |
| 2008/0180410 A1* | 7/2008 | McCall | G06T 11/203 345/179 |
| 2011/0199297 A1 | 8/2011 | Antonyuk et al. | |
| 2011/0310118 A1 | 12/2011 | Asmi et al. | |
| 2013/0136377 A1* | 5/2013 | Luo | G06T 5/00 382/275 |
| 2013/0271487 A1* | 10/2013 | Lincoln | G06F 3/0488 345/619 |
| 2014/0098072 A1 | 4/2014 | Singh et al. | |
| 2014/0160068 A1 | 6/2014 | Westerman et al. | |
| 2014/0225846 A1* | 8/2014 | Ishida | G06T 11/203 345/173 |
| 2014/0365878 A1 | 12/2014 | Dai et al. | |
| 2015/0062021 A1* | 3/2015 | Skaljak | G06F 3/04883 345/173 |
| 2015/0091832 A1* | 4/2015 | Mizunuma | G06F 3/0488 345/173 |

OTHER PUBLICATIONS

Hu, et al., "Optimization of Point Selection on Digital Ink Curves," In Proceedings of the 2012 International Conference on Frontiers in Handwriting Recognition, Sep. 2012, 6 pages.

U.S. Application No. PCT/US2015/051828, Tu, et al., "Wet Ink Predictor," Filed Date: Sep. 24, 2015.

"Using the writing pad and touch keyboard in Tablet PC Input Panel," Published on: Jul. 23, 2010 Available at: http://windows.microsoft.com/en-in/windows7/using-the-writing-pad-and-touch-keyboard-in-tablet-pc-input-panel.

U.S. Application No. PCT/US2015/051828, Tu, et al., "Ink Modeler for Beautiful Ink on Touch and Active Pen Devices," Filed Date: Sep. 24, 2015.

* cited by examiner

FIG. 13 improved timestamp table — 1300

| timestamp | x position | y position | time elapsed | 6-sample average elapsed time | improved timstamp |
|---|---|---|---|---|---|
| 09:07:05.0100 | 55 | 73 | | | |
| 09:07:05.0126 | 77 | 79 | 0.0026 | | |
| 09:07:05.0248 | 89 | 81 | 0.0122 | | |
| 09:07:05.0272 | 101 | 77 | 0.0024 | | |
| 09:07:05.0341 | 124 | 65 | 0.0069 | | |
| 09:07:05.0475 | 135 | 57 | 0.0134 | | |
| 09:07:05.0502 | 140 | 41 | 0.0027 | 0.0067 | 09:07:05.0542 |
| 09:07:05.0573 | 142 | 35 | 0.0071 | 0.0075 | 09:07:05.0617 |
| 09:07:05.0702 | 136 | 32 | 0.0129 | 0.0076 | 09:07:05.0693 |
| 09:07:05.0724 | 128 | 29 | 0.0022 | 0.0075 | 09:07:05.0768 |
| 09:07:05.0855 | 119 | 31 | 0.0131 | 0.0086 | 09:07:05.0854 |
| 09:07:05.0881 | 101 | 36 | 0.0026 | 0.0068 | 09:07:05.0922 |

Rows: 1301–1312. Columns: 1351 (timestamp), 1352 (x position), 1353 (y position), 1354 (time elapsed), 1355 (6-sample average elapsed time), 1356 (improved timestamp).

improved velocity table ⟵1400

| timestamp | x position | y position | time elapsed | distance traveled | velocity | 6-sample average velocity | improved velocity |
|---|---|---|---|---|---|---|---|
| 09:07:05.0100 | 55 | 73 | | | | | |
| 09:07:05.0126 | 77 | 79 | 0.0026 | 22.80 | 8771 | | |
| 09:07:05.0248 | 89 | 81 | 0.0122 | 12.17 | 997 | | |
| 09:07:05.0272 | 101 | 77 | 0.0024 | 12.65 | 5270 | | |
| 09:07:05.0341 | 124 | 65 | 0.0069 | 25.94 | 3760 | | |
| 09:07:05.0475 | 135 | 57 | 0.0134 | 13.60 | 1015 | | |
| 09:07:05.0502 | 140 | 41 | 0.0027 | 16.76 | 6209 | 4337 | 4337 |
| 09:07:05.0573 | 142 | 35 | 0.0071 | 6.32 | 891 | 3024 | 3024 |
| 09:07:05.0702 | 136 | 32 | 0.0129 | 6.71 | 520 | 2944 | 2944 |
| 09:07:05.0724 | 128 | 29 | 0.0022 | 8.54 | 3884 | 2713 | 2713 |
| 09:07:05.0855 | 119 | 31 | 0.0131 | 9.22 | 704 | 2204 | 2204 |
| 09:07:05.0881 | 101 | 36 | 0.0026 | 18.68 | 7185 | 3232 | 3232 |

FIG. 14

ADAPTIVE INK PREDICTION

BACKGROUND

Many processor-based devices support electronic ink: a user input technique where the user handwrites, draws, or performs other arbitrary spatial movements. As a result of such user input, visual marks called "ink" are added to the display that generally correspond to the path of the movement. For example, in the case of handwriting, handwritten words appear on the display in the same handwriting style that they were executed by the user.

In some cases, the user performs this input by moving a stylus (or "pen") or his or her finger (collectively, "the writing object") across the surface of a touchscreen display device, generating a sequence of 2-dimensional contact points each having a timestamp identifying the time at which the contact point was touched. In some cases, the user performs the inking input by moving a displayed position pointer on the screen, using an input device such as a mouse or touchpad. This information is sometimes referred to as "ink input." The device transforms this ink input into ink that is displayed by generating a sequence of "ink strokes"—straight or curved segments of ink interpreted from the ink input, such as by interpolating and/or smoothing the contact points of the ink input.

Even in devices having powerful processors, high-speed data buses, etc., the process of generating and displaying ink takes a certain amount of time, sometimes referred to as "latency." In many cases, this latency is large enough that the generated and displayed ink strokes lag a perceptible distance behind the tip of the writing object as it moves, preventing the user from forming and maintaining the sense that he or she is directing ink onto the drawing surface by his or her movement of the writing object.

In order to overcome the potential negative effects of inking latency, in some cases, the device uses techniques such as extrapolation and/or curve-fitting to predict one or more future contact points, and generates and displays ink using those predicted contact points along with the actual ink input, seeking to extend the ink to a point nearer the tip of the writing object.

In some cases, ink input also contains information about various other kinds of attributes, such as an indication of force or pressure—which can be used by the device in order to determine the thickness of the ink strokes it generates—and pen angle—which can affect the thickness and/or opacity level of ink strokes. In some cases, the prediction performed by the device extends to one or more of these additional attributes.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for adapting the prediction of ink is described. In some examples, the facility receives information about a spatial movement by a user. On the basis of the received information, the facility predicts future spatial movement by the user, and generates an ink stroke that reflects both the spatial movement described by the received information and at least a portion of the predicted future spatial movement. The facility enforces against the generated ink stroke a limit that has the effect of controlling the area of a portion of the ink stroke corresponding to the at least a portion of the predicted future spatial movement, and causes the generated ink stroke, subject to the enforcement of the limit, to be displayed.

BRIEF DESCRIPTION OF THE DRAWINGS

FIG. 13 is a table diagram showing contents of a sample improved timestamp table reflecting the improvement of noisy timestamps in accordance with the process shown in FIG. 12.

FIG. 14 is a table diagram showing contents of a sample improved velocity table reflecting the improvement of noisy velocities in accordance with the process shown in FIG. 12.

DETAILED DESCRIPTION

Figure 1:
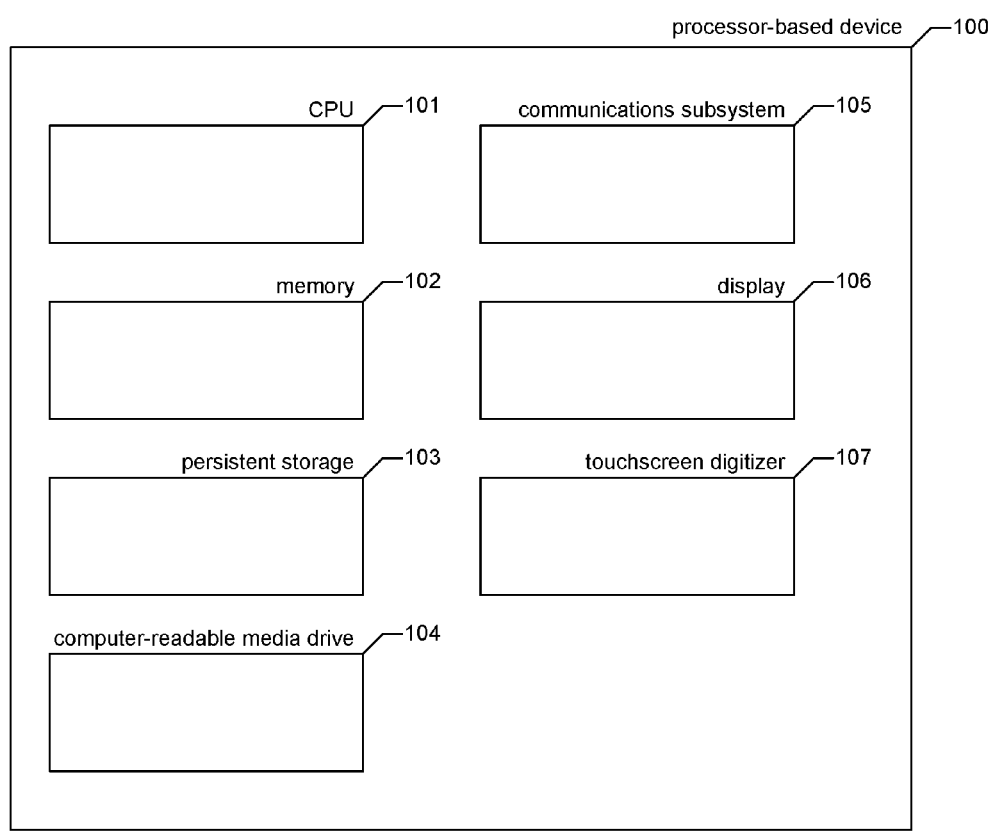
FIG. 1 is a block diagram showing some of the components that may be incorporated in at least some of the computer systems and other devices on which the facility operates.

The inventors have identified cases in which conventional ink prediction causes undesirable results. These include predicting that the writing object will turn in the wrong direction; predicting that the writing object will be further ahead than it actually is; predicting that the ink will be too thick; displaying erroneous predicted ink when the ink is so thick as to make the error particularly conspicuous; and making erroneous predictions based upon noisy ink input, such as ink input in which timestamps and/or velocity experience systemic or random error.

Accordingly, the inventors have conceived and reduced to practice a software and/or hardware facility ("the facility") for adapting the prediction of ink in ways that reduce the undesirable results of conventional ink prediction.

In some examples, the facility limits the thickness of predicting ink, such as by capping the thickness of predicted ink at a maximum prediction thickness boundary, or by discarding any predicted contact points for which a thickness exceeding a maximum prediction thickness boundary is predicted and those predicted for later times. In some examples, the facility performs a similar kind of bounding with respect to a minimum prediction thickness boundary, including, in some cases, ending prediction when actual or predicted ink thickness reaches the minimum prediction thickness boundary.

In some examples, the facility establishes an inverse relationship between the thickness and extent of prediction—that is, as the thickness of ink currently being displayed by the facility increases, the amount of time or distance for which the facility displays predicted ink decreases In some examples, in order to determine whether to display predicted ink, the facility compares the instantaneous direction at the latest end of the predicted ink to the instantaneous direction at the latest end of the ink based upon actual contact points. If the direction at the latest end of the predicted ink diverges from the direction at the latest end of the ink based upon actual contact points by more than a threshold angle, the facility omits to display the predicted ink.

In some examples, the facility handles noisy timestamp and/or velocity data, such as by subjecting it to sliding-window averaging.

In some examples, the facility's adaptation of ink prediction is performed with respect to "wet" ink displayed before the user lifts the pen or other writing object from the writing surface, and does not affect "dry" ink that is displayed and recorded when the writing object is lifted from the writing surface. This dry ink is generated based solely on actual contact points, without the use of any ink prediction.

By performing in some or all of the ways described above, the facility improves the inking experience of users for whom ink prediction is being performed. In various examples, the facility further improves the efficiency with which inking processes consume hardware resources—such as processor cycles and space in short-term and long-term memory, on buses, etc.—enabling such hardware resources to be used for additional purposes, or less powerful hardware resources to be substituted.

FIG. 1 is a block diagram showing some of the components that may be incorporated in at least some of the computer systems and other devices on which the facility operates. In various examples, these computer systems and other devices 100 can include server computer systems, desktop computer systems, laptop computer systems, tablet computer systems, netbooks, mobile phones, personal digital assistants, televisions, cameras, automobile computers, electronic media players, electronic kiosk devices, electronic table devices, electronic whiteboard devices, etc. In various examples, the computer systems and devices may include any number of the following: a central processing unit ("CPU") 101 for executing computer programs; a computer memory 102 for storing programs and data while they are being used, including the facility and associated data, an operating system including a kernel and device drivers, and one or more applications; a persistent storage device 103, such as a hard drive or flash drive for persistently storing programs and data; a computer-readable media drive 104, such as a floppy, CD-ROM, or DVD drive, for reading programs and data stored on a computer-readable medium; and/or a communications subsystem 105 for connecting the computer system to other computer systems and/or other devices to send and/or receive data, such as via the Internet or another wired or wireless network and its networking hardware, such as switches, routers, repeaters, electrical cables and optical fibers, light emitters and receivers, radio transmitters and receivers, and the like.

In various examples, these computer systems and other devices 100 may further include any number of the following: a display 106 for presenting visual information, such as text, images, icons, documents, menus, etc.; and a touch-screen digitizer 107 for sensing interactions with the display, such as touching the display with one or more fingers, styluses, or other objects. In various examples, the touch-screen digitizer uses one or more available techniques for sensing interactions with the display, such as resistive sensing, surface acoustic wave sensing, surface capacitance sensing, projected capacitance sensing, infrared grid sensing, infrared acrylic projection sensing, optical imaging sensing, dispersive signal sensing, and acoustic pulse recognition sensing. In various examples, the computer systems and other devices 100 include input devices of various other types, such as keyboards, mice, styluses, etc. (not shown).

While computer systems or other devices configured as described above may be used to support the operation of the facility, those skilled in the art will appreciate that the facility may be implemented using devices of various types and configurations, and having various components.

Figure 2:
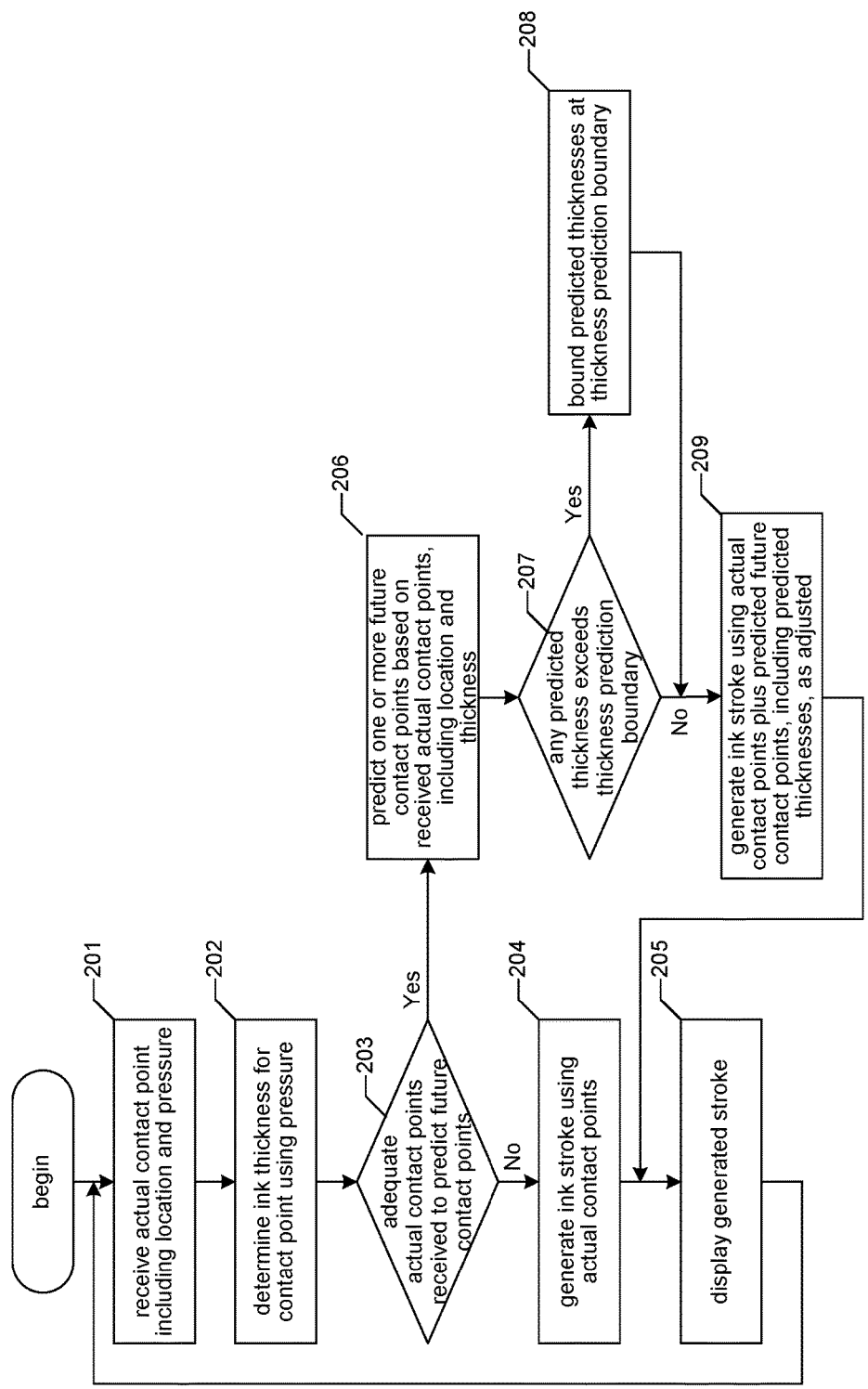
FIG. 2 is a flow diagram showing a first process performed by the facility in some examples to limit the thickness of predicted ink.

FIG. 2 is a flow diagram showing a first process performed by the facility in some examples to limit the thickness of predicted ink. At 201, the facility receives an actual contact point from the input device. The received actual contact point includes at least touch location and pressure (or a correlated measure, such as force; hereafter, such measures are referred to interchangeably). At 202, the facility uses the pressure of the actual contact point received at 201 to determine an ink thickness for the contact point. In general, the higher the pressure, the larger the ink thickness. At 203, if the facility has received actual contact points that are adequate to predict future contact points, then the facility continues at 206, else the facility continues at 204. In various examples, the facility makes the determination of act 203 by, for example, comparing the number of actual contact points to a predetermined minimum number; attempting to fit a curve or otherwise project future contact points and determining whether the result has an adequate level of certainty, etc. At 204, the facility generates an ink stroke using received actual contact points, to the exclusion of any predicted future contact points. At 205, the facility displays the ink stroke generated at 204. After act 205, the facility continues at 201 to receive the next contact point.

At 206, where adequate actual contact points have been received to predict future contact points, the facility predicts one or more future contact points based on actual contact points received at 202. The future contact points predicted at 206 each include at least location and ink thickness. At 207, if any thickness predicted for future contact points at 206 exceeds a thickness prediction boundary, then the facility continues at 208, else the facility continues at 209. At 208, the facility bounds the thicknesses predicted at 206 at the thickness prediction boundary—that is, for each predicted thickness that exceeds the thickness prediction boundary, the facility reduces the predicted thickness to the thickness prediction boundary. At 209, the facility generates an ink stroke using received actual contact points plus predicted future contact points using the thicknesses determined for actual contact points at 202 and the thicknesses predicted for future contact points at 206, subject to any adjustments performed at 208. After act 209, the facility continues at 205 to display the ink stroke generated at 209.

Those skilled in the art will appreciate that the steps shown in FIG. 2 and in each of the flow diagrams discussed below may be altered in a variety of ways. For example, the order of the steps may be rearranged; some steps may be performed in parallel; shown steps may be omitted, or other steps may be included; a shown step may be divided into substeps, or multiple shown steps may be combined into a single step, etc.

Figure 3:
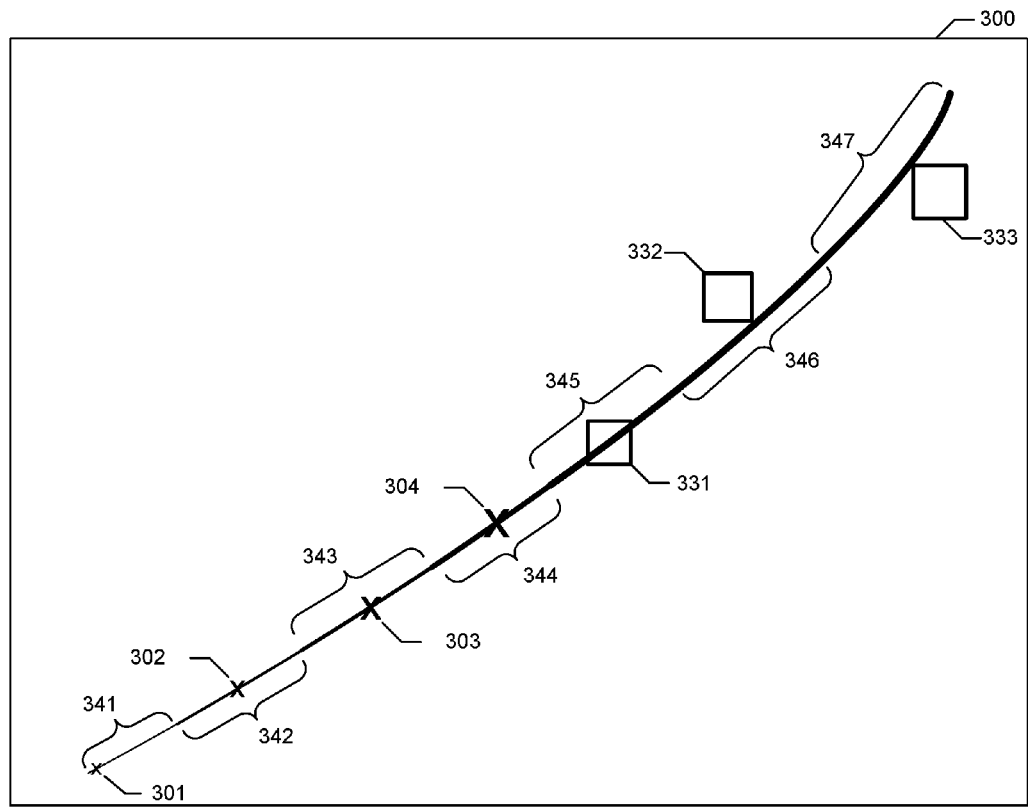
FIG. 3 is a display diagram showing ink displayed by the facility based upon received actual and predicted future contact points in accordance with the process shown in FIG. 2.

FIG. 3 is a display diagram showing ink displayed by the facility based upon received actual and predicted future contact points in accordance with the process shown in FIG. 2. The display 300 shows actual contact points 301-304, each shown as an "X". In particular, the size of each "X" indicates the relative level of pressure received for the corresponding actual contact point. It can be seen that, moving from actual contact point 301 to actual contact point 304, the level of pressure steadily increases. The display further shows predicted future contact points 331-333, each shown as a "□". Similarly, the size of each "□" indicates an ink thickness predicted for the corresponding predicted future contact point. It can be seen that, moving from predicted future contact point 331 to predicted future contact point 333, the pressure level predicted for these contact points continues to increase beyond the pressure level of the most recent actual contact point 304. By examining the thickness of the ink stroke made up of stroke segments 341-347, it can be seen that, moving from stroke segment 341 to stroke segment 345, the ink thickness steadily increases in accordance with the increasing pressure among the actual and predicted contact points. In some examples, the ink thickness varies more smoothly through the length of a stroke than shown in FIG. 3. In stroke segment 345, however, the ink thickness reaches the thickness prediction boundary. Accordingly, the ink thickness in stroke segments 346 and 347 is limited to the same value as in stroke segment 345 at, despite the pressure levels of predicted future contact points 332 and 333, which continue to increase.

Figure 4:
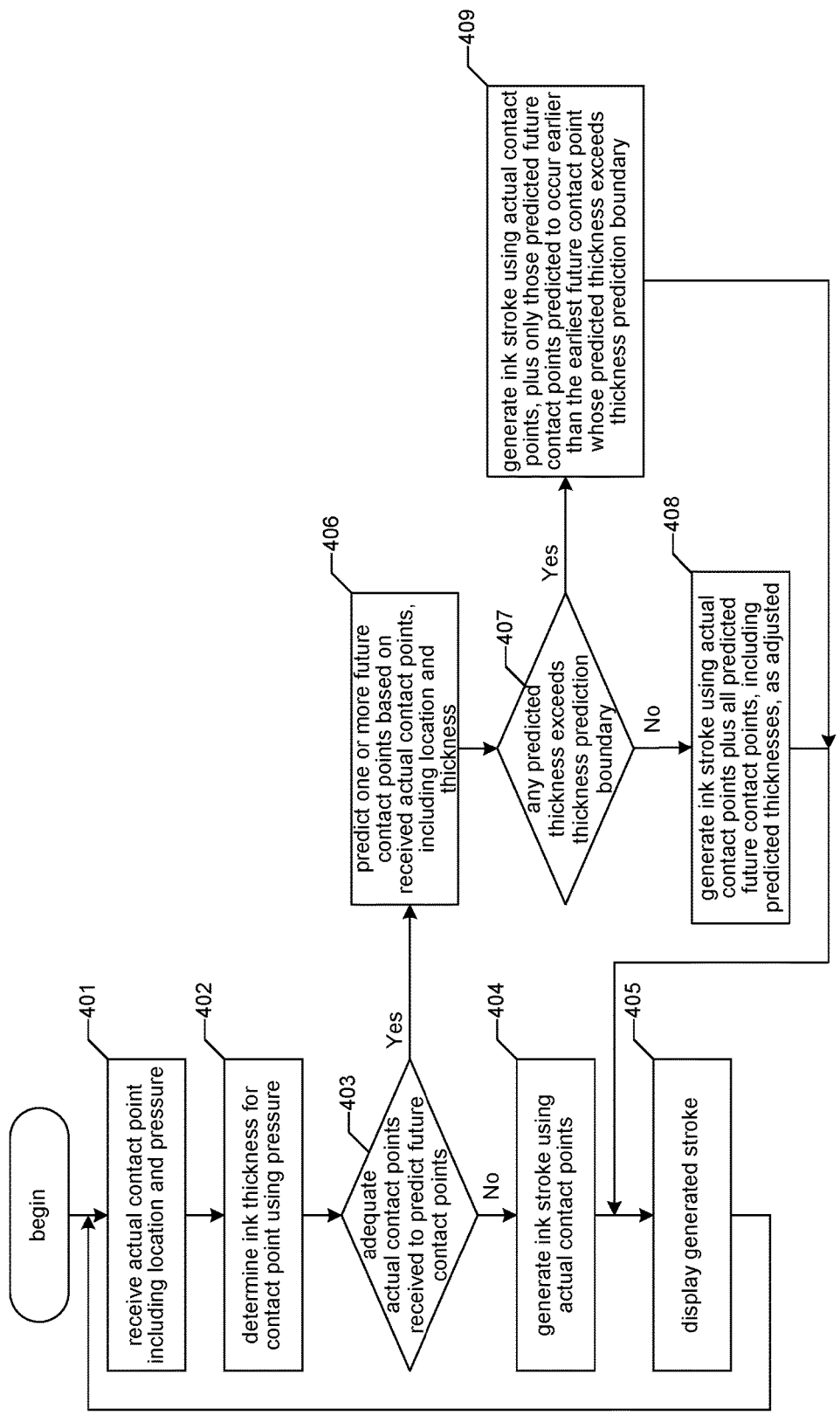
FIG. 4 is a flow diagram showing a process performed by the facility in some examples to limit the thickness of predicted ink.

FIG. 4 is a flow diagram showing a process performed by the facility in some examples to limit the thickness of predicted ink. At 401, the facility receives an actual contact point from the input device. The received actual contact point includes at least touch location and pressure. At 402, the facility uses the pressure of the actual contact point received at 401 to determine an ink thickness for the contact point. In general, the higher the pressure, the larger the ink thickness. At 403, if the facility has received actual contact points that are adequate to predict future contact points, then the facility continues at 406, else the facility continues at 404. At 404, the facility generates an ink stroke using received actual contact points, to the exclusion of any predicted future contact points. At 405, the facility displays the ink stroke generated at 404. After act 405, the facility continues at 401 to receive the next contact point.

At 406, where adequate actual contact points have been received to predict future contact points, the facility predicts one or more future contact points based on actual contact points received at 402. The future contact points predicted at 406 each include at least location and ink thickness. At 407, if any thickness predicted for future contact points at 406 exceeds a thickness prediction boundary, then the facility continues at 408, else the facility continues at 409. At 408, the facility generates an ink stroke predicted future contact points using the thicknesses determined for actual contact points at 402 and he thicknesses predicted for future contact points at 406. After 408, the facility continues at 405 to display the ink stroke generated at 408. At 409, the facility generates an ink stroke using received actual contact points, plus only those predicted future contact points that precede in time the earliest predicted future contact point whose predicted thickness exceeds a thickness prediction boundary. After 409, the facility continues at 405 to display the ink stroke generated at 409.

Figure 5:
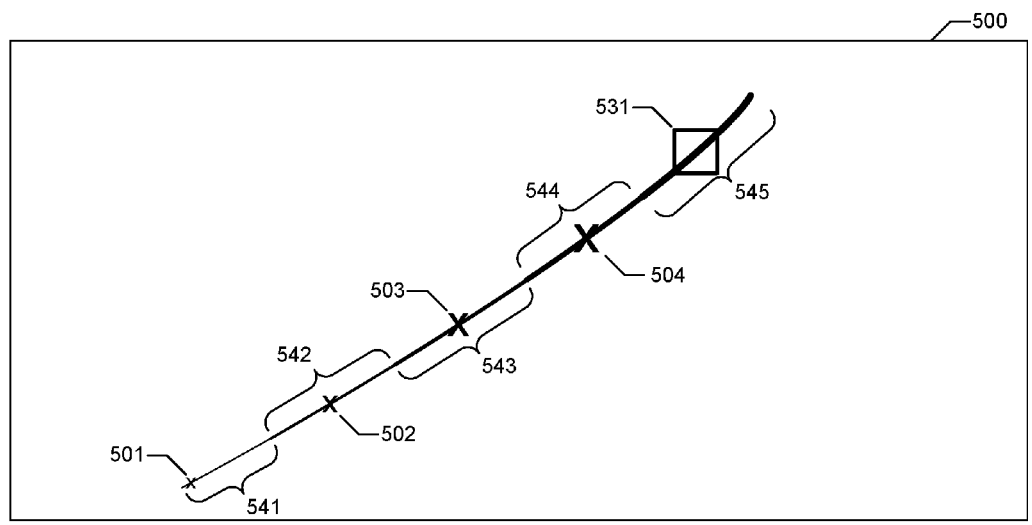
FIG. 5 is a display diagram showing ink displayed by the facility based upon received actual and predicted future contact points in accordance with the process shown in FIG. 4.

FIG. 5 is a display diagram showing ink displayed by the facility based upon received actual and predicted future contact points in accordance with the process shown in FIG. 4. The display 500 represents the same input as the display shown in FIG. 3, and shows actual contact points 501-504, as well as predicted future contact point 331. It can be seen that, in generating the stroke made up of stroke segments 541-545, the facility has ignored later predicted future contact points 332 and 333 shown in FIG. 3, as the thickness predicted for future contact point 332 exceeds the thickness prediction boundary.

Figure 6:
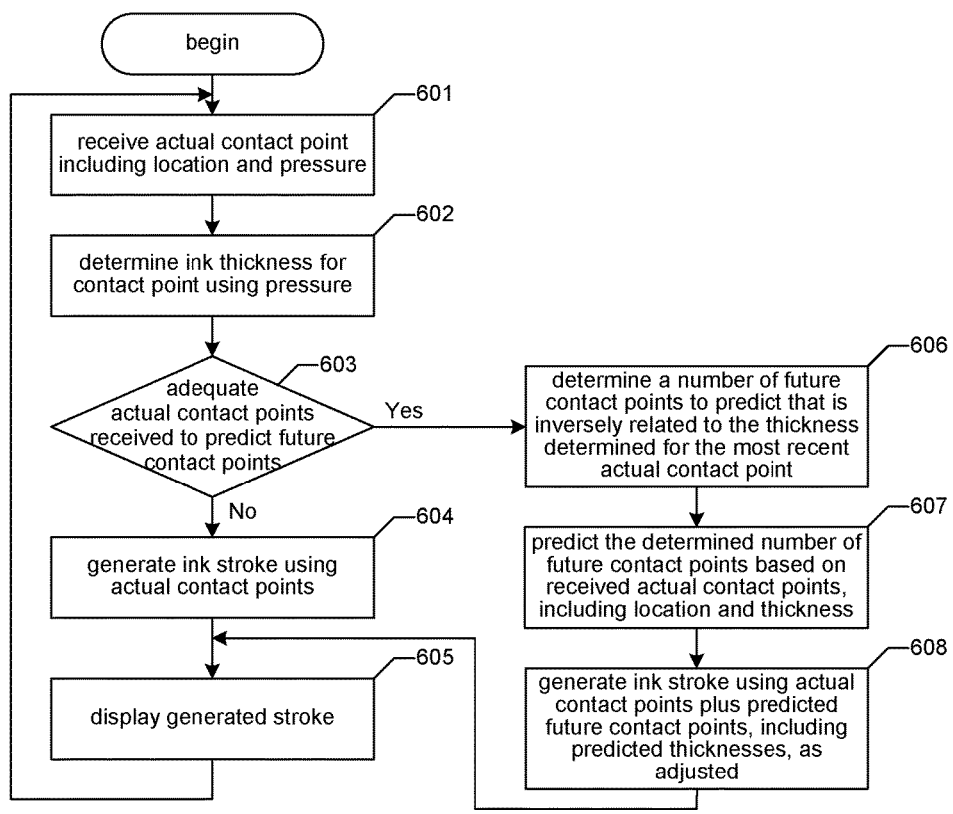
FIG. 6 is a flow diagram showing a process performed by the facility in some examples to control the extent of ink prediction based upon ink thickness.

FIG. 6 is a flow diagram showing a process performed by the facility in some examples to control the extent of ink prediction based upon ink thickness. At 601, the facility receives an actual contact point from the input device. The received actual contact point includes at least touch location and pressure. At 602, the facility uses the pressure of the actual contact point received at 601 to determine an ink thickness for the contact point. At 603, if the facility has received actual contact points that are adequate to predict future contact points, then the facility continues at 606, else the facility continues at 604. At 604, the facility generates an ink stroke using received actual contact points, to the exclusion of any predicted future contact points. At 605, the facility displays the ink stroke generated at 604. After act 605, the facility continues at 601 to receive the next contact point.

At 606, where adequate actual contact points have been received to predict future contact points, the facility determines a number of future contact points to predict that is inversely related to the thickness determined for the most recent actual contact point. In some examples, for instance, the facility establishes a first range of possible ink thicknesses, and a second range of possible numbers of future contact points to predict, distances to predict ink, etc.; the facility selects a point in the second range that is the same percentage of the size of the second range away from the top of the second range as the actual ink width is from the bottom of the first range. In various examples, at 606, the facility determines an extent to which to predict ink in accordance with a variety of measures, including number of contact points, distance, amount of time at average or sample velocity, etc. At 607, the facility predicts one or more future contact points based on actual contact points received at 602, to an extent determined by the facility at 606. At 608, the facility generates an ink stroke using received actual contact points plus predicted future touch. After act 608, the facility continues at 605 to display the ink stroke generated at 608.

Figure 7:
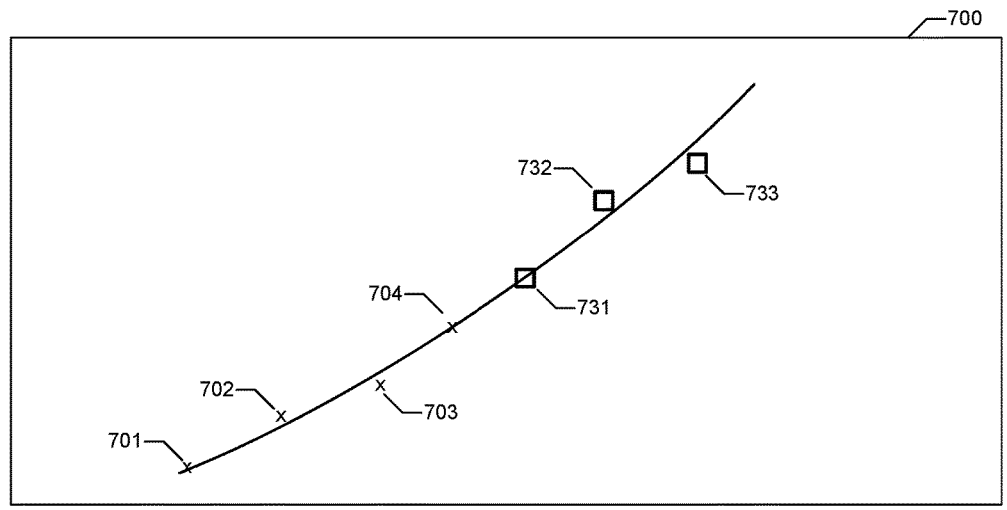
FIGS. 7 and 8 are display diagrams showing ink displayed by the facility based upon received actual and predicted future contact points in accordance with the process shown in FIG. 6.
Figure 8:
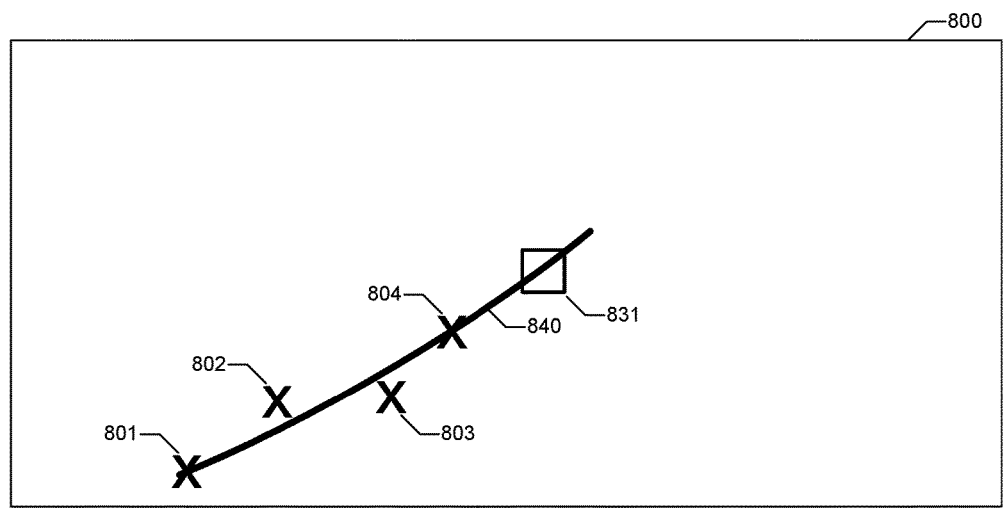

FIGS. 7 and 8 are display diagrams showing ink displayed by the facility based upon received actual and predicted future contact points in accordance with the process shown in FIG. 6. In particular, FIG. 8 shows ink produced by the facility at a higher thickness.

In FIG. 7, the display 700 shows actual contact points 701-704, as well as three predicted future contact points 731-733. It can be seen that the ink 740 generated by the facility has a relatively low thickness, and extends through all three predicted future contact points.

In FIG. 8, the display 800 shows actual contact points 801-804, as well as a single predicted future contact point 831. It can be seen that, in response to a higher pressure than was used in FIG. 7, the ink 840 generated by the facility has a higher thickness than the ink shown in FIG. 7, and extends only through one predicted future contact point.

Figure 9:
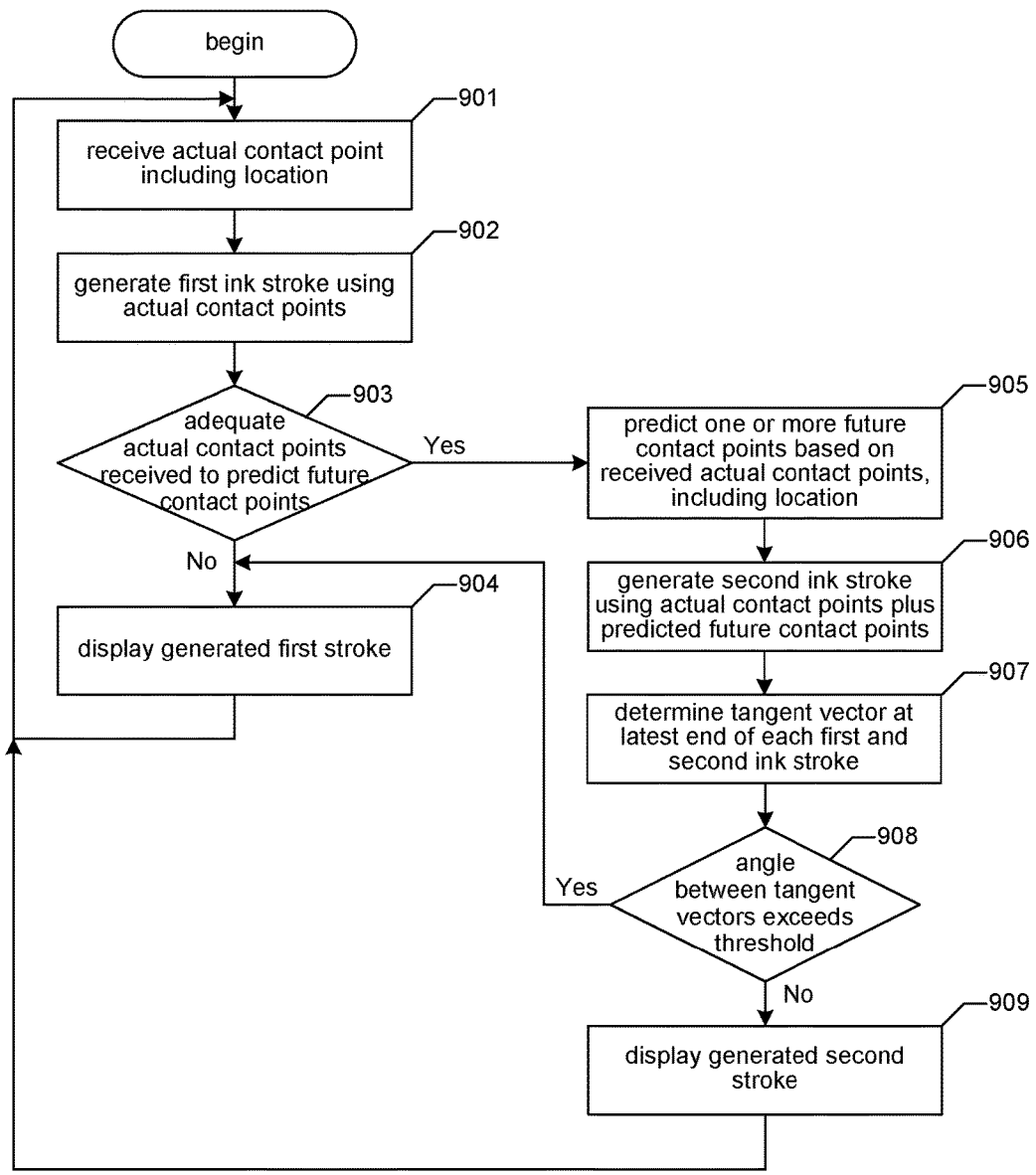
FIG. 9 is a flow diagram showing a process performed by the facility in some examples to opt not to display predicted ink where it diverges from actual ink at too great an angle.

FIG. 9 is a flow diagram showing a process performed by the facility in some examples to opt not to display predicted ink where it diverges from actual ink at too great an angle. At 901, the facility receives an actual contact point from the input device. The received actual contact point includes at least touch location. At 902, the facility generates a first ink stroke using only actual contact points received at 901, to the exclusion of any predicted future contact points. At 903, if the facility has received actual contact points that are adequate to predict future contact points, then the facility continues at 905, else the facility continues at 904. At 904, the facility displays the first ink stroke generated at 902 solely on the basis of actual contact points. After act 904, the facility continues at 901 to receive the next contact point.

At 905, where adequate actual contact points have been received to predict future contact points, the facility predicts one or more future contact points based on actual contact points received at 901. The future contact points predicted at 905 each include at least location. At 906, the facility generates a second ink stroke using received actual contact points plus predicted future contact points. At 907, for each of the first and second ink stroke, the facility determines a tangent factor at the latest end of the ink stroke that indicates the instantaneous direction at the latest end of the ink stroke. At 908, if the angle between the 2 tangent factors determined at 907 exceeds a threshold angle, such as a threshold angle of 35°, then the facility continues at 904 to display the first stroke generated solely on the basis of actual contact points, else the facility continues at 909. At 909, the facility displays the second stroke generated on the basis of both actual contact points and predicted future contact points. After act 909, the facility continues at 901 to receive the next contact point.

Figure 10:
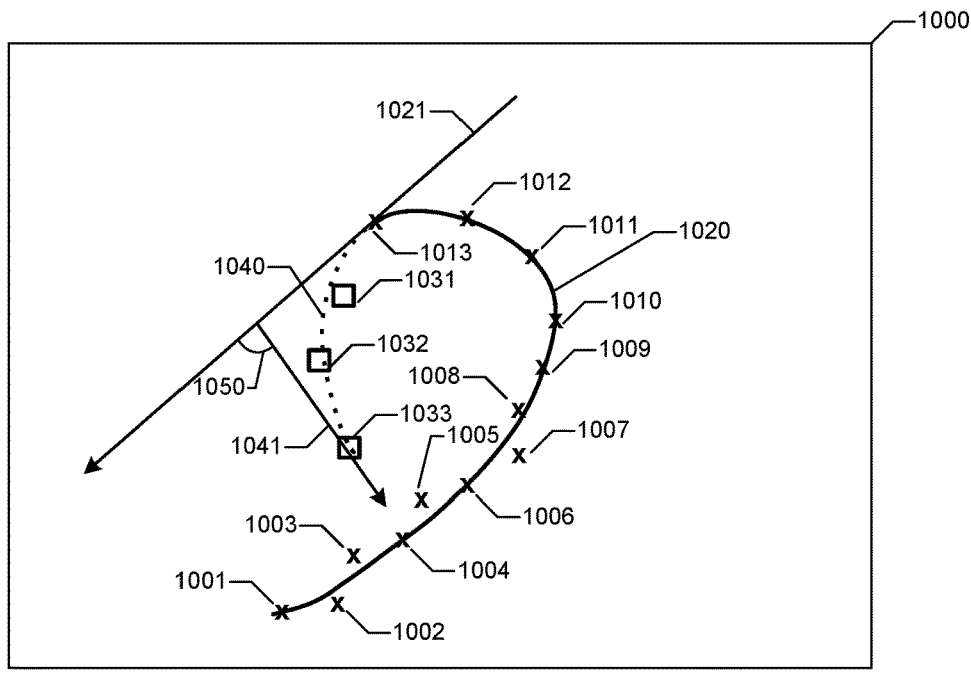
FIGS. 10 and 11 are display diagrams showing ink displayed by the facility in accordance with the process shown in FIG. 9.
Figure 11:
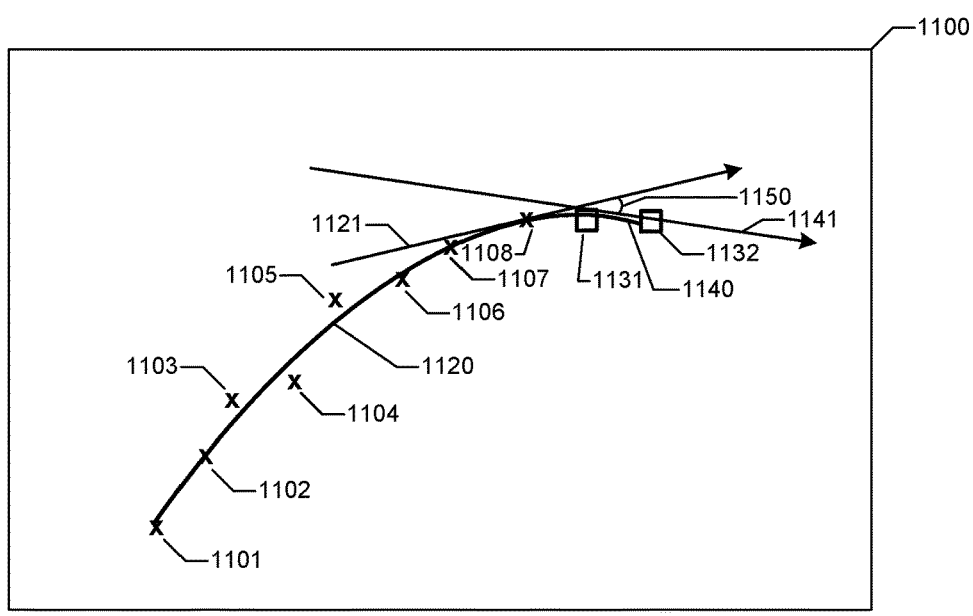

FIGS. 10 and 11 are display diagrams showing ink displayed by the facility in accordance with the process shown in FIG. 9. In particular, FIG. 10 shows a situation in which the facility opts against displaying predicted ink, in contrast to FIG. 11 which shows a situation in which the facility does display predicted ink.

In FIG. 10, the display 1000 shows actual contact points 1001-1013, and predicted future contact points 1031-1033. Also shown are first stroke 1020 generated by the facility based only on the actual contact points, and a second stroke 1020+1040 generated by the facility based on both the actual contact points and the predicted future contact points. In order to determine whether to display the first stroke or the second stroke, the facility determines tangent 1021 at the latest end of the first stroke, and tangent 1041 at the latest end of the second stroke. These two tangents form angle 1050 which, at 85°, exceeds the facility's threshold angle of 35°. Accordingly, the facility displays the first stroke 1020 which omits predicted ink 1040, rather than the second stroke 1020+1040 that includes predicted ink 1040.

In FIG. 11, the display 1100 shows actual contact points 1101-1108, and predicted future contact points 1131-1132. Also shown are first stroke 1120 generated by the facility based only on the actual contact points, and a second stroke 1120+1140 generated by the facility based on both the actual contact points and the predicted future contact points. In order to determine whether to display the first stroke or the second stroke, the facility determines tangent 1121 at the latest end of the first stroke, and tangent 1141 at the latest end of the second stroke. These two tangents form angle 1150 which, at 25°, does not exceed the facility's threshold angle of 35°. Accordingly, the facility displays the second stroke 1020, which includes predicted ink 1140.

Figure 12:
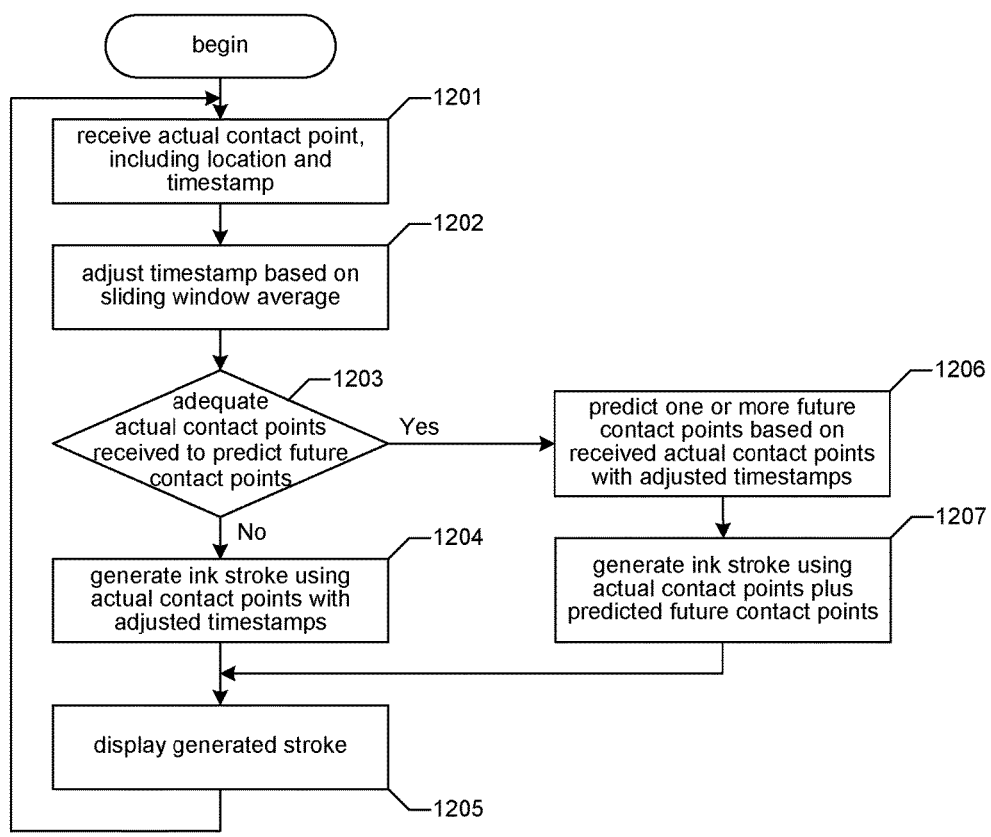
FIG. 12 is a flow diagram showing a first process performed by the facility in some examples to improve noisy timestamp and/or velocity data.

FIG. 12 is a flow diagram showing a first process performed by the facility in some examples to improve noisy timestamp and/or velocity data. At 1201, the facility receives an actual contact point from the input device. The received actual contact point includes at least touch location and timestamp. At 1202, the facility adjusts the timestamp of the actual contact point received at 1201 by subjecting it to a sliding window average, such as one that uses a window size of the interval size between the last 6 pairs of timestamps. In some examples, rather than adjusting each contact point's timestamp, the facility adjusts a velocity at each contact point. At 1203, if the facility has received actual contact points that are adequate to predict future contact points, then the facility continues at 1206, else the facility continues at 1204. At 1204, the facility generates an ink stroke using only actual contact points received at 1201 with their adjusted timestamps or velocities, to the exclusion of any predicted future contact points. At 1205, the facility displays the first ink stroke generated at 1204 solely on the basis of actual contact points. After act 1205, the facility continues at 1201 to receive the next contact point.

At 1206, where adequate actual contact points have been received to predict future contact points, the facility predicts one or more future contact points based on actual contact points received at 1201 with their adjusted timestamps or velocities. The future contact points predicted at 905 each include at least location and timestamp. At 1207, the facility generates an ink stroke using received actual contact points plus predicted future contact points. After act 1207, the facility continues at 1205 to display the ink stroke generated at 1207.

FIG. 13 is a table diagram showing contents of a sample improved timestamp table reflecting the improvement of noisy timestamps in accordance with the process shown in FIG. 12. The improved timestamp table 1300 is made up of rows 1301-1312, each corresponding to a different contact point. Each row is divided into the following columns: a timestamp column 1351 containing the timestamp received as part of the contact point to which the row corresponds; an x position column 1352 containing the horizontal coordinate of the contact point position, expressed in units such as physical pixels, logical pixels, distance, etc.; a y position column 1353 containing the vertical coordinate of the contact point position; a time elapsed column 1354 containing an elapsed time calculated between the timestamp of the current contact point in the timestamp of the immediately-preceding contact point; an average elapsed time column 1355 containing an average of the elapsed times of the current contact point and the five immediately-preceding contact points; and an improved timestamp column 1356 containing an improved timestamp for the contact point calculated by adding the average elapsed time for the current contact point to the timestamp or improved timestamp for the immediately preceding contact point. For example, row 1307 indicates that the corresponding contact point was received with the timestamp "09:07:05.0502", and the position (140, 41); that an elapsed time between this timestamp and the timestamp of the immediately preceding contact point is 0.0027 seconds; that the six-sample average elapsed time is 0.0067 seconds; and that the improved timestamp for this contact point is "09:07:05.0542".

While FIG. 13 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

FIG. 14 is a table diagram showing contents of a sample improved velocity table reflecting the improvement of noisy velocities in accordance with the process shown in FIG. 12. The improved velocity table 1400 is made up of rows 1401-1412, each corresponding to a different contact point. Each row is divided into the following columns: a timestamp column 1451 containing the timestamp received as part of the contact point to which the row corresponds; an x position column 1452 containing the horizontal coordinate of the contact point position, expressed in units such as physical pixels, logical pixels, distance, etc.; a y position column 1453 containing the vertical coordinate of the contact point position; a time elapsed column 1454 containing an elapsed time calculated between the timestamp of the current contact point in the timestamp of the immediately-preceding contact point; a distance traveled column 1455 containing a distance traveled calculated from the two-dimensional position of the immediately preceding contact point to the two-dimensional position of the current contact point; a velocity column 1456 containing a velocity calculated by dividing the distance traveled by the time elapsed; an average velocity column 1457 containing an average of the velocities of the current contact point and the five immediately-preceding contact points; and an improved velocity column 1458 containing an improved velocity for the contact point determined by copying the average velocity. For example, row 1407 indicates that the corresponding contact point was received with the timestamp "09:07:05.0502", and the position (140, 41); that an elapsed time between this timestamp and the timestamp of the immediately preceding contact point is 0.0027 seconds; that the distance traveled from the previous contact point to this contact point is 16.76 pixels; that this reflects a velocity of 6209 pixels per second; that the six-sample average velocity is 4337; and that the improved velocity is 4337.

In some examples, the facility provides a processor-based device, comprising: a processor; a touchscreen; and a memory having contents that cause the processor to: receive a sequence of touch points generated using the touchscreen; determine a first ink stroke based upon the received sequence of touch points, the first ink stroke having a later end corresponding to the last touch point in the received sequence; on the basis of the received sequence of touch points, predict a sequence of one or more predicted future touch points; determine a second ink stroke based upon the received sequence of touch points plus the one or more predicted future touch points, the second ink stroke having a later end corresponding to the last future touch point in the predicted sequence; determine a first instantaneous direction of the first ink stroke at its later end; determine a second instantaneous direction of the second ink stroke at its later end; determine an angle between the first and second directions; where the determined angle exceeds a threshold angle, display the first ink stroke; and where the determined angle does not exceed the threshold angle, display the second ink stroke.

In some examples, the facility provides a computer-readable medium having contents configured to cause a computing system to: receive a sequence of touch points generated using the touchscreen; determine a first ink stroke based upon the received sequence of touch points, the first ink stroke having a later end corresponding to the last touch point in the received sequence; on the basis of the received sequence of touch points, predict a sequence of one or more future touch points; determine a second ink stroke based upon the received sequence of touch points plus the one or more predicted future touch points, the second ink stroke having a later end corresponding to the last future touch point in the predicted sequence; determine a first instantaneous direction of the first ink stroke at its later end; determine a second instantaneous direction of the second ink stroke at its later end; determine an angle between the first and second directions; where the determined angle exceeds a threshold angle, display the first ink stroke; and where the determined angle does not exceed the threshold angle, display the second ink stroke.

In some examples, the facility provides a method in a computing system, the method comprising: receiving a sequence of touch points generated using the touchscreen; determining a first ink stroke based upon the received sequence of touch points, the first ink stroke having a later end corresponding to the last touch point in the received sequence; on the basis of the received sequence of touch points, predicting a sequence of one or more future touch points; determine a second ink stroke based upon the received sequence of touch points plus the one or more predicted future touch points, the second ink stroke having a later end corresponding to the last future touch point in the predicted sequence; determining a first instantaneous direction of the first ink stroke at its later end; determine a second instantaneous direction of the second ink stroke at its later end; determining an angle between the first and second directions; where the determined angle exceeds a threshold angle, displaying the first ink stroke; and where the determined angle does not exceed the threshold angle, displaying the second ink stroke.

In some example, the facility provides a computer-readable medium having contents configured to cause a computing system to: receive information about a spatial movement by a user; on the basis of the received information, predict future spatial movement by the user; generate an ink stroke that reflects both the spatial movement described by the received information and at least a portion of the predicted future spatial movement; enforce against the generated ink stroke a limit that has the effect of controlling the area of a portion of the ink stroke corresponding to the at least a portion of the predicted future spatial movement; and cause the generated ink stroke, subject to the enforcement of the limit, to be displayed.

In some examples, the facility provides a processor-based device, comprising: a processor; and a memory having contents that cause the processor to: receive information about a spatial movement by a user; on the basis of the received information, predict future spatial movement by the user; generate an ink stroke that reflects both the spatial movement described by the received information and at least a portion of the predicted future spatial movement; enforce against the generated ink stroke a limit that has the effect of controlling the area of a portion of the ink stroke corresponding to the at least a portion of the predicted future spatial movement; and cause the generated ink stroke, subject to the enforcement of the limit, to be displayed.

In some examples, the facility provides a method in a computing system, the method comprising: receiving information about a spatial movement by a user; on the basis of the received information, predicting future spatial movement by the user; generating an ink stroke that reflects both the spatial movement described by the received information and at least a portion of the predicted future spatial movement; enforcing against the generated ink stroke a limit that has the effect of controlling the area of a portion of the ink stroke corresponding to the at least a portion of the predicted future spatial movement; and causing the generated ink stroke, subject to the enforcement of the limit, to be displayed.

In some examples, the facility provides a computer-readable medium storing a data structure containing information about touch input touch points, the data structure comprising: for each of a plurality of touch points, an entry comprising: coordinates at which the touch point occurred; an improved time-related indication attributed to the touch point, the improved time-related indication constituting an aggregation on time-related indications originally attributed to the touch point and at least one contiguously-preceding touch point, the entries with their improved time-related indications being usable to predict future touch points with greater accuracy than is possible with the time-related indications originally attributed to the touchpoints.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A non-transitory computer-readable medium having contents configured to cause a computing system to:
   receive information about a spatial movement by a user;
   on the basis of the received information, predict future spatial movement by the user;
   generate an ink stroke that reflects both the spatial movement described by the received information and at least a portion of the predicted future spatial movement;
   enforce against the generated ink stroke a limit that has the effect of controlling the area of a portion of the ink stroke corresponding to the at least a portion of the predicted future spatial movement; and
   cause the generated ink stroke, subject to the enforcement of the limit, to be displayed,
   wherein an extent of the predicted future spatial movement that is determined by enforcement of the limit is a number of contact points of the predicted future spatial movement that are reflected in the generated ink stroke,
   wherein the limit that is enforced against the generated ink stroke determines the extent of the predicted future spatial movement to be reflected in the generated ink stroke in a way that inversely relates the extent of the predicted future spatial movement that is reflected in the generated ink stroke to a thickness of the generated ink stroke.

2. The non-transitory computer-readable medium of claim 1 wherein the extent of the predicted future spatial movement that is determined by the enforcement of the limit further includes a distance of the predicted future spatial movement that is reflected in the generated ink stroke.

3. The non-transitory computer-readable medium of claim 1 wherein the limit that is enforced against the generated ink stroke limits a thickness of a portion of the ink stroke reflecting the at least a portion of the predicted future spatial movement to be no greater than a boundary thickness.

4. The non-transitory computer-readable medium of claim 1 wherein the limit that is enforced against the generated ink stroke determines the extent of the predicted future spatial movement to be reflected in the generated ink stroke in a way that omits portions of the predicted future spatial movement that either (1) exceed a boundary thickness, or (2) are predicted to occur later than a portion that exceeds the boundary thickness.

5. A method in a computing system, comprising:
   receiving information about a spatial movement by a user;
   on the basis of the received information, predicting future spatial movement by the user;
   generating an ink stroke that reflects both the spatial movement described by the received information and at least a portion of the predicted future spatial movement;
   enforcing against the generated ink stroke a limit that has the effect of controlling the area of a portion of the ink stroke corresponding to the at least a portion of the predicted future spatial movement; and
   causing the generated ink stroke, subject to the enforcement of the limit, to be displayed,
   wherein an extent of the predicted future spatial movement that is determined by enforcement of the limit is a number of contact points of the predicted future spatial movement that are reflected in the generated ink stroke,
   wherein the limit that is enforced against the generated ink stroke determines the extent of the predicted future spatial movement to be reflected in the generated ink stroke in a way that inversely relates the extent of the predicted future spatial movement that is reflected in the generated ink stroke to a thickness of the generated ink stroke.

6. The method of claim 5 wherein the extent of the predicted future spatial movement that is determined by the enforcement of the limit further includes a distance of the predicted future spatial movement that is reflected in the generated ink stroke.

7. The method of claim 5 wherein the limit that is enforced against the generated ink stroke limits a thickness of a portion of the ink stroke reflecting the at least a portion of the predicted future spatial movement to be no greater than a boundary thickness.

8. The method of claim 5 wherein the limit that is enforced against the generated ink stroke determines the extent of the predicted future spatial movement to be reflected in the generated ink stroke in a way that omits portions of the predicted future spatial movement that either (1) exceed a boundary thickness, or (2) are predicted to occur later than a portion that exceeds the boundary thickness.

* * * * *